(12) United States Patent
Seo et al.

(10) Patent No.: US 12,393,028 B2
(45) Date of Patent: Aug. 19, 2025

(54) HEAD MOUNTED DISPLAY (71) Applicant: LG Chem, Ltd., Seoul (KR)

(72) Inventors: Dae Han Seo, Daejeon (KR); Jae Jin Kim, Daejeon (KR); Min Soo Song, Daejeon (KR); Bu Gon Shin, Daejeon (KR); Hyun Joo Son, Daejeon (KR)

(73) Assignee: LG Chem, Ltd., Seoul (KR)

( * ) Notice: Subject to any disclaimer, the term of this patent is extended or adjusted under 35 U.S.C. 154(b) by 875 days.

(21) Appl. No.: 17/430,955

(22) PCT Filed: Aug. 7, 2020

(86) PCT No.: PCT/KR2020/010499
§ 371 (c)(1),
(2) Date: Aug. 13, 2021

(87) PCT Pub. No.: WO2021/066314
PCT Pub. Date: Apr. 8, 2021

(65) Prior Publication Data
US 2022/0146829 A1 May 12, 2022

(30) Foreign Application Priority Data

Sep. 30, 2019 (KR) .......... 10-2019-0121204
Jul. 31, 2020 (KR) .......... 10-2020-0095887

(51) Int. Cl.
*G02B 27/01* (2006.01)
*G02B 27/42* (2006.01)

(52) U.S. Cl.
CPC ..... *G02B 27/0172* (2013.01); *G02B 27/0103* (2013.01); *G02B 27/4227* (2013.01);
(Continued)

(58) Field of Classification Search
CPC ............ G02B 27/0172; G02B 27/0103; G02B 27/4227; G02B 2027/0174;
(Continued)

(56) References Cited

U.S. PATENT DOCUMENTS 11,231,581 B2 * 1/2022 Jia ............................ G02B 5/18
2002/0101568 A1 8/2002 Eberl et al.
(Continued)

FOREIGN PATENT DOCUMENTS

CN 102033319 A 4/2011
CN 104903774 A 9/2015
(Continued)

OTHER PUBLICATIONS

Extended European Search Report and European Search Opinion for European Application No. 20872066.4 dated Feb. 18, 2022, 9 pgs.

(Continued)

*Primary Examiner* — Henry Duong
(74) *Attorney, Agent, or Firm* — Lerner David LLP (57) ABSTRACT

A head mounted display is disclosed herein. In some embodiments, a head mounted display includes a lens unit configured to be disposed in front of an eye of a wearer; an holographic optical element disposed on an eye side surface or a surface opposite the eye side surface of the lens unit; and an image display unit configured to be disposed on a lateral side of the eye of the wearer and configured to output image display light. The image display unit includes at least one of a liquid crystal display panel or an organic light emitting display panel to output the image display light toward the holographic optical element, and the holographic optical element diffracts the image display light and reflects the diffracted image display light toward the eye of the wearer.

8 Claims, 5 Drawing Sheets

(52) U.S. Cl.
CPC .............. *G02B 2027/0174* (2013.01); *G02B 2027/0178* (2013.01)

(58) Field of Classification Search
CPC .... G02B 2027/0178; G02B 2027/0123; G02B 27/017; G02B 5/32; G02B 27/01; G02B 27/0101; G02B 27/0149; G02B 27/0176; G02B 27/0179; G02B 27/0189; G02B 2027/0105; G02B 2027/0107; G02B 2027/0109; G02B 2027/011; G02B 2027/0112; G02B 2027/0114; G02B 2027/0116; G02B 2027/0118; G02B 2027/012; G02B 2027/0121; G02B 2027/0125; G02B 2027/0127; G02B 2027/0129; G02B 2027/013; G02B 2027/0132; G02B 2027/0134; G02B 2027/0136; G02B 2027/0138; G02B 2027/014; G02B 2027/0141; G02B 2027/0143; G02B 2027/0145; G02B 2027/0147; G02B 2027/015; G02B 2027/0152; G02B 2027/0154; G02B 2027/0156; G02B 2027/0158; G02B 2027/0159; G02B 2027/0161; G02B 2027/0163; G02B 2027/0165; G02B 2027/0167; G02B 2027/0169; G02B 2027/0181; G02B 2027/0183; G02B 2027/0185; G02B 2027/0187; G02B 2027/019; G02B 2027/0192; G02B 2027/0194; G02B 2027/0196; G02B 2027/0198
USPC ......................................................... 359/630
See application file for complete search history.

(56) References Cited

U.S. PATENT DOCUMENTS

| | | |
|---|---|---|
| 2009/0231687 A1 | 9/2009 | Yamamoto |
| 2010/0149073 A1* | 6/2010 | Chaum .............. G02B 27/0075 345/8 |
| 2013/0100511 A1 | 4/2013 | Yamamoto et al. |
| 2013/0141527 A1 | 6/2013 | Shimizu et al. |
| 2014/0185142 A1 | 7/2014 | Gupta et al. |
| 2015/0279114 A1 | 10/2015 | Yonekubo |
| 2015/0293357 A1 | 10/2015 | Shin et al. |
| 2016/0033771 A1 | 2/2016 | Tremblay et al. |
| 2016/0033772 A1 | 2/2016 | Han |
| 2016/0252726 A1 | 9/2016 | Ishida |
| 2017/0102548 A1 | 4/2017 | Tremblay et al. |
| 2017/0255013 A1 | 9/2017 | Tam et al. |
| 2018/0196265 A1 | 7/2018 | Bouchier et al. |
| 2019/0219968 A1 | 7/2019 | Bouchier et al. |
| 2019/0285897 A1 | 9/2019 | Topliss et al. |
| 2020/0150439 A1 | 5/2020 | Ouderkirk et al. |

FOREIGN PATENT DOCUMENTS

| | | |
|---|---|---|
| CN | 105572877 A | 5/2016 |
| CN | 105929536 A | 9/2016 |
| CN | 106164745 A | 11/2016 |
| CN | 205982840 U | 2/2017 |
| CN | 107479197 A | 12/2017 |
| CN | 108027507 A | 5/2018 |
| CN | 207396866 U | 5/2018 |
| CN | 108700751 A | 10/2018 |
| CN | 109960040 A | 7/2019 |
| JP | H10319240 A | 12/1998 |
| JP | 2004341027 A | 12/2004 |
| JP | 2005099751 A | 4/2005 |
| JP | 3678264 B2 | 8/2005 |
| JP | 2006091041 A | 4/2006 |
| JP | 2009244869 A | 10/2009 |
| JP | 2010072150 A | 4/2010 |
| JP | 2010139589 A | 6/2010 |
| JP | 4968362 B2 | 7/2012 |
| JP | 2017009720 A | 1/2017 |
| JP | 2018528452 A | 9/2018 |
| JP | 6413291 B2 | 10/2018 |
| KR | 19960016722 | 6/1996 |
| KR | 20140049863 A | 4/2014 |
| KR | 20150136601 A | 12/2015 |
| KR | 20160105325 A | 9/2016 |
| KR | 20180044238 A | 5/2018 |
| WO | 2011155357 A1 | 12/2011 |

OTHER PUBLICATIONS

Search report from International Application No. PCT/KR2020/010499 mailed Nov. 17, 2020.

\* cited by examiner

HEAD MOUNTED DISPLAY

CROSS-REFERENCE TO RELATED APPLICATIONS

The present application is a national phase entry under 35 U.S.C. § 371 of International Application No. PCT/KR2020/0010499, filed on Aug. 7, 2020, which claims priority from Korean Patent Application No. 10-2020-0095887, filed on Jul. 31, 2020, and Korean Patent Application No. 10-2019-0121204, filed on Sep. 30, 2019, the disclosures of which are incorporated by reference herein.

TECHNICAL FIELD

The present invention relates to a head mounted display.

BACKGROUND ART

Recently, with an increase in interest in display devices that implement augmented reality (AR), mixed reality (MR), or virtual reality (VR), research on the display devices has been actively conducted. A display unit that implements the augmented reality (AR), the mixed reality (MR), or the virtual reality (VR) includes a diffraction light guide plate using a diffraction phenomenon based on the wave nature of light.

As such a diffraction light guide plate, a type including a plurality of diffraction optical elements having a plurality of uneven grating patterns and a type having a transmissive holographic optical element as a photosensitive material on which an interference pattern has been recorded are mainly used.

Meanwhile, in the case of the type having the diffraction optical element, image crosstalk may occur due to low color separation efficiency thereof. Furthermore, in the case of the type having the diffraction optical element or the transmissive holographic optical element, a large overall light loss may occur.

On the other hand, in the case of a type having a reflective holographic optical element, color separation efficiency is high and light loss is also smaller than that of the diffraction optical element or the transmissive holographic optical element. However, when an image output unit that outputs an image to the reflective holographic optical element is used as a projector, the divergence angle of beams outputted based on individual pixels is limited, resulting in the limitation of the size of an area of the reflective holographic optical element. When the size of the area of the reflective holographic optical element is limited, even though the position of an eye is changed, the area of an eye motion box defined as an area, where an image diffractively reflected through the reflective holographic optical element is visible as is, is also limited.

The background art described above is technology information, which has been possessed by the present inventors for deriving embodiments of the present invention or acquired in the process of deriving the embodiments of the present invention, and it may not be necessarily said that the background art is a publicly-known technology disclosed to the general public prior to the filing of the application for the embodiments of the present invention.

DISCLOSURE

Technical Problem

Embodiments of the present invention intend to provide a head mounted display capable of securing a wide eye motion box while implementing a virtual image by using a reflective holographic optical element.

Problems to be solved by the present invention are not limited to the aforementioned problems, and the other unmentioned problems will be clearly understood by those skilled in the art from the following description.

Technical Solution

An embodiment of the present invention provides a head mounted display including a lens unit configured to be disposed in front of an eye of a wearer; an holographic optical element disposed on one surface (eye side surface) or the other surface (opposite surface to the eye side surface) of the lens unit; and an image display unit configured to be disposed on a lateral side of the eye of the wearer and configured to output image display light, wherein the image display unit includes at least one of a liquid crystal display panel and an organic light emitting display panel to output the image display light toward the holographic optical element, and the holographic optical element diffracts the image display light and reflects the diffracted image light toward the eye of the wearer.

According to an embodiment of the present invention, the holographic optical element may be disposed on an eye side surface of the lens unit.

According to an embodiment of the present invention, the at least one of the liquid crystal display panel or the organic light emitting display panel may be spaced apart from a first surface, which extends along the eye side surface of the lens unit, in a direction toward the rear of the eye of the wearer, and may output the image display light toward the eye side surface of the lens unit.

According to an embodiment of the present invention, the lens unit may include a transparent or translucent substrate which external light is able to be transmitted from the surface opposite the eye side surface to the eye side surface of the lens unit.

According to an embodiment of the present invention, the lens unit and the image display unit may be installed on at least one of eyeglass frames, goggles, and a helmet.

According to an embodiment of the present invention, wherein the lens unit comprises a right lens unit and a left lens unit corresponding to both eyes of the wearer, respectively, and wherein the image display unit comprises a right image display unit and a left image display unit corresponding to both eyes of the wearer, respectively.

Advantageous Effects

The head mounted display according to an embodiment of the present invention can secure a wide eye motion box while implementing a virtual image by using a reflective holographic optical element.

BEST MODE

The present invention will become apparent by reference to the following detailed description in conjunction with the accompanying drawings. However, the present invention is not limited to such embodiments and may be realized in various forms. The embodiments to be described below are nothing but the ones provided to bring the disclosure of the present invention to perfection and assist those skilled in the art to which the present invention pertains to completely understand the scope of the present invention. The present invention is defined only by the scope of the appended claims. The terminology used herein is for the purpose of describing embodiments only and is not intended to limit the present invention. As used herein, the singular forms are intended to include the plural forms as well, unless the context clearly indicates otherwise. The terms "comprises" and/or "comprising" of stated component, step, operation and/or element, when used herein, do not exclude the presence or addition of one or more other components, steps, operations, and/or elements. The terms such as first and second may be used to describe various components, but the components are not limited by the terms. The terms are used only to distinguish one component from another component.

Figure 1:
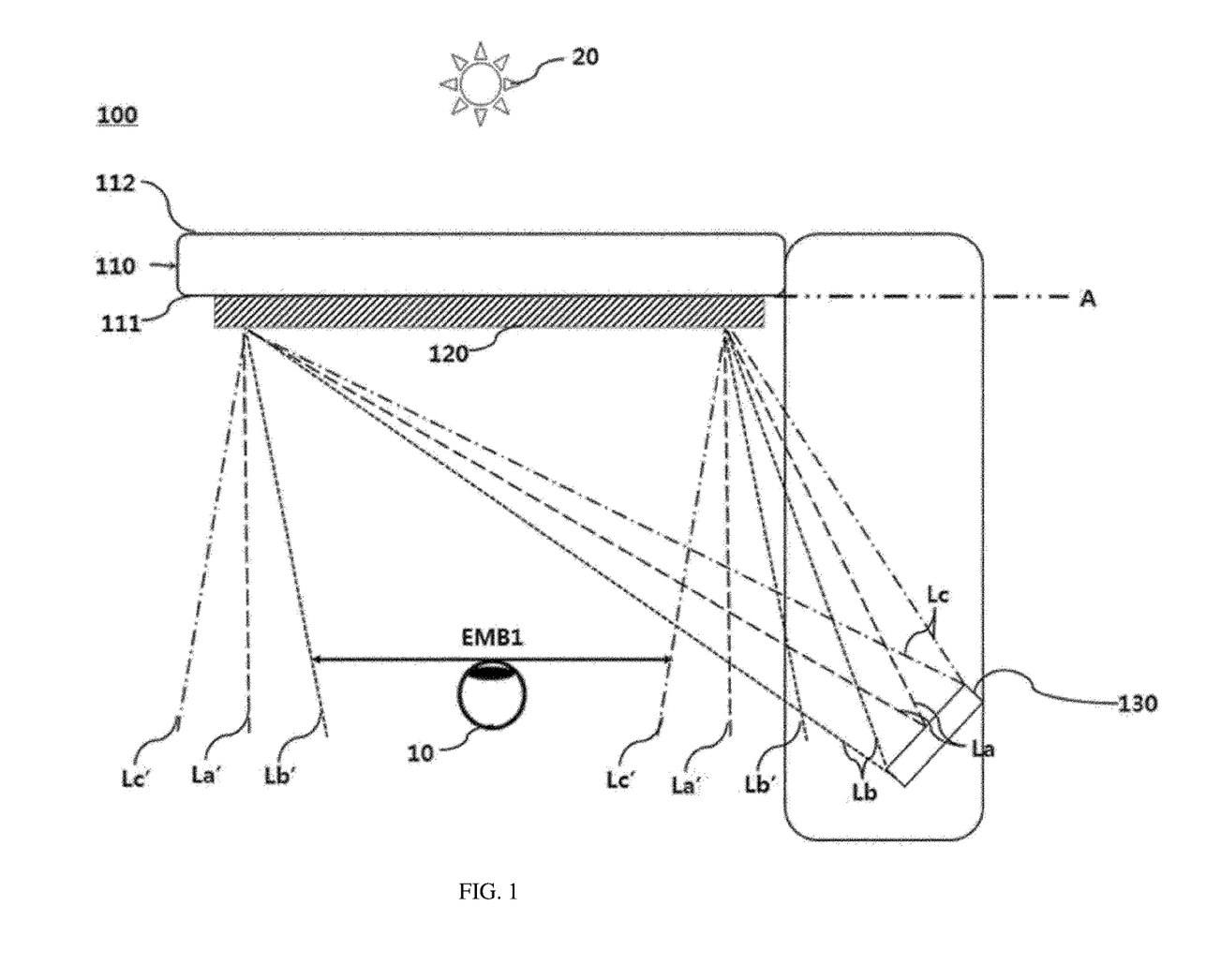
FIG. 1 is a schematic view of a head mounted display according to an embodiment of the present invention.

FIG. 1 is a schematic view of a head mounted display 100 according to an embodiment of the present invention.

Referring to FIG. 1, the head mounted display 100 according to the embodiment of the present invention is a display device that can be mounted on the head of a wearer, and may include a lens unit 110, a holographic optical element 120, and an image display unit 130.

The lens unit 110 may be disposed in front of an eye 10 of the wearer. In an embodiment, the lens unit 110 may have a transparent or translucent substrate which external light 20 can transmit from a surface 112 opposite to an eye side 111 of the wearer. Such a substrate may be made of a high refractive transparent glass or high refractive light transparent plastic material. In the illustrated embodiment, the lens unit 110 has a flat shape; however, the present invention is not limited thereto and the lens unit 110 may have a curved shape.

The holographic optical element 120 may be disposed on one surface or the other surface of the lens unit 110, and may be formed by recording a hologram so as to diffract incident image display light, which will be described below, in a direction designed in advance, that is, toward a side where the eye 10 of the wearer is located. In an embodiment, the holographic optical element 120 may be formed by recording a hologram such that the image display light reaching the holographic optical element 120 may be diffracted into parallel light and reflected.

The image display unit 130 may be disposed on the lateral side of the eye 10 of the wearer and may output the image display light. Specifically, the image display unit 130 may receive an electrical signal having image information and output the image display light for the image information. In an embodiment, the image display unit 130 may include a liquid crystal display (LCD) panel or a display panel composed of organic light emitting diodes (OLEDs) (hereinafter, referred to as an organic light emitting display panel). In the present embodiment, the image display unit 130 may output the image display light toward the holographic optical element 120 by using at least one of the liquid crystal display panel or the organic light emitting display panel.

The holographic optical element 120 directs the image display light, which is output from the display panel of the image display unit 130, toward the eye 10 of the wearer through reflection using diffraction, thereby forming a virtual image of the image display light including image information. Accordingly, the wearer may recognize the virtual image as if the wearer sees an image through a screen at a certain distance.

In the present embodiment, no separate lens capable of condensing the image display light is disposed between the image display unit 130 configured as the display panel and the holographic optical element 120.

Accordingly, the image display light outputted by the image display unit 130 spreads with a wide divergence angle, reaches the holographic optical element 120, and is diffracted by the holographic optical element 120, so that light reflected from the holographic optical element 120 may be directed toward the eye 10 of the wearer as wide-width parallel light.

Specifically, first image display light La outputted from the center of the image display unit 130 and second image display light Lb and third image display light Lc outputted from both ends of the image display unit 130 may travel while spreading until reaching the holographic optical element 120. Therefore, the first image display light La, the second image display light Lb, and the third image display light Lc may be incident onto the holographic optical element 120 with wide-wide incident ranges La-La, Lb-Lb, and Lc-Lc, respectively, and may be diffracted and reflected as first reflected image display light La', second reflected image display light Lb', and third reflected image display light Lc', respectively, by the holographic optical element 120. Then, the first reflected image display light La', the second reflected image display light Lb', and the third reflected image display light Lc' may be directed toward the eye 10 of the wearer as the wide-width parallel light.

In such a case, a portion, where the reflection range La'-La' of the first reflected image display light La', the reflection range Lb'-Lb' of the second reflected image display light Lb', and the reflection range Lc'-Lc' of the third reflected image display light Lc' overlap one another, may be an eye motion box 1 (EMB1) where a plurality of exit pupils are located.

Figure 2A:
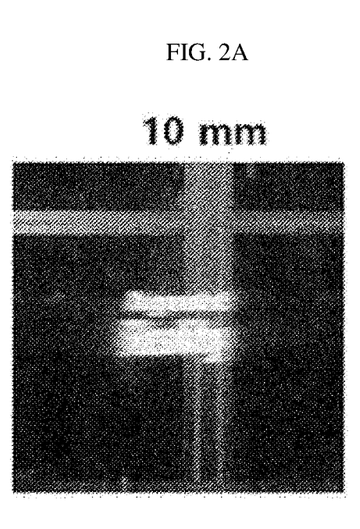
FIGS. 2A to 2C are views illustrating a change in a field of view according to the size of an image display unit.
Figure 2B:
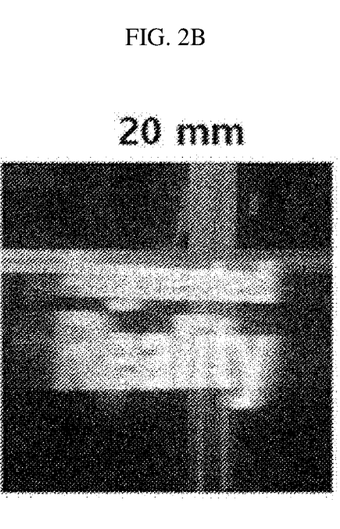
Figure 2C:
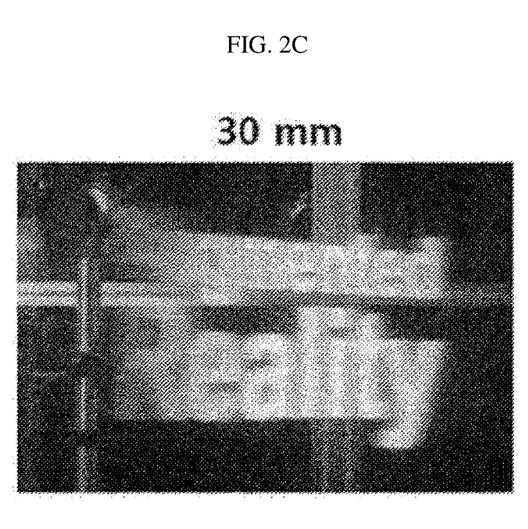
Figure 2D:
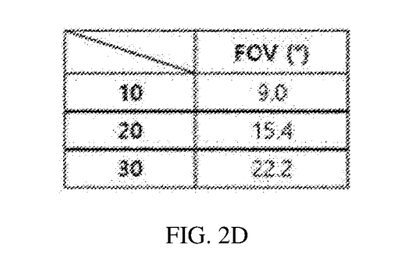
FIG. 2D illustrates the field of view at each size of image display unit illustrated in FIGS. 2A to 2C.

FIGS. 2A to 2C are views illustrating a change in a field of view according to the size of the image display unit. FIG. 2D illustrates the field of view at each size of image display unit illustrated in FIGS. 2A to 2C.

Referring to FIGS. 2A to 2D, it can be seen that the field of view in the embodiment is determined according to the size of the image display unit 130, and in order to secure a field of view or 15° or more, it is necessary to use the image display unit 130 having a size of 20 mm or more.

Figure 3:
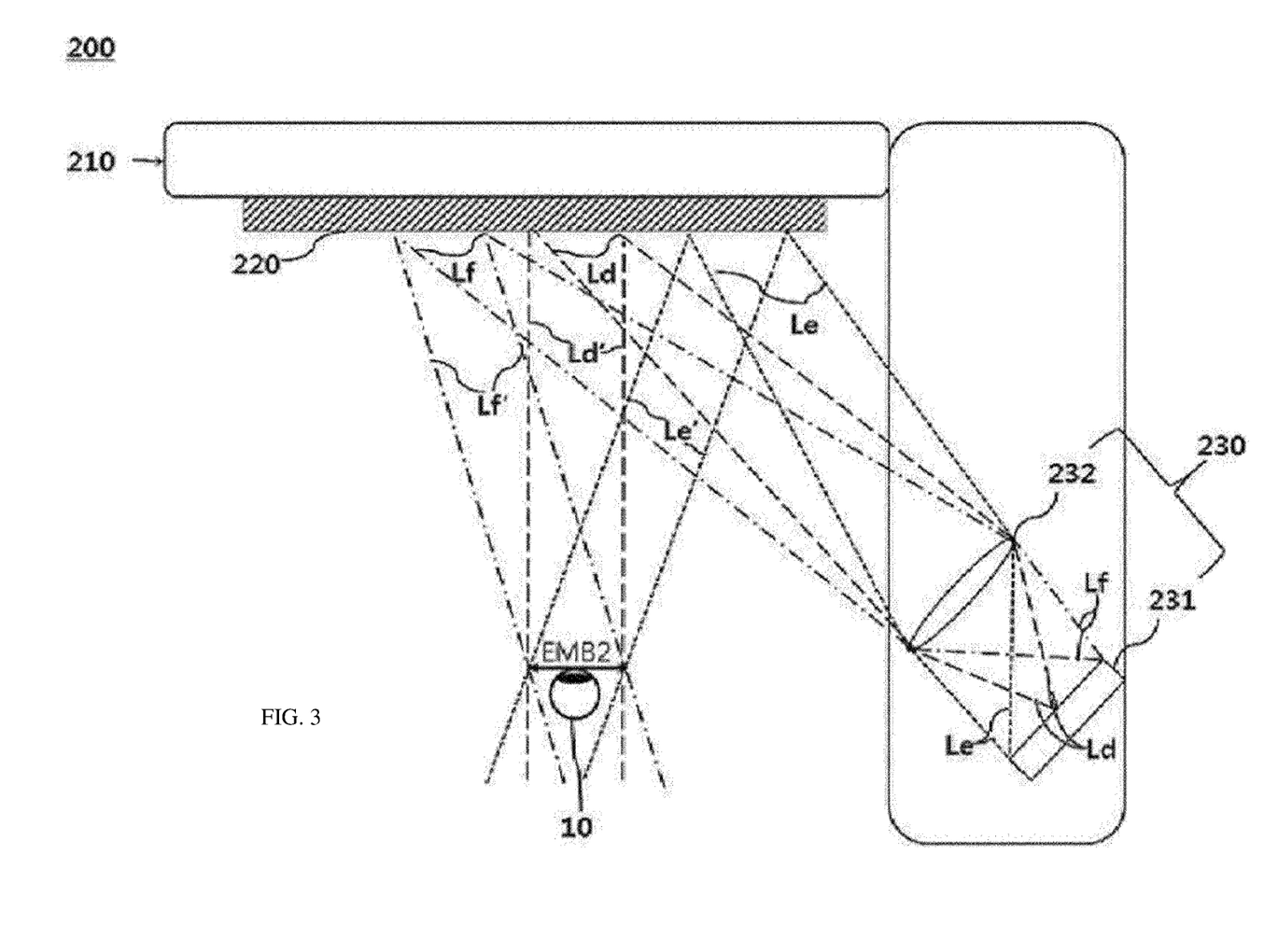
FIG. 3 is a schematic view of a head mounted display according to a comparative example.

FIG. 3 is a schematic view of a head mounted display 200 according to a comparative example.

The head mounted display 200 according to the comparative example may be the same as the head mounted display 100 according to the embodiment, except that an image display unit 230 is configured as a beam projector additionally including a lens 232 capable of condensing image display light together with a display panel 231.

REFERENCE NUMERALS IN COMPARATIVE EXAMPLE

200: head mounted display
210: lens unit

220: holographic optical element
230: image display unit

The image display light outputted by the display panel 231 according to the comparative example spreads with a wide divergence angle and is condensed by the lens 232, and then reaches the holographic optical element 220 in a narrower shape. Accordingly, light diffracted and reflected by the holographic optical element 220 may be directed toward the eye 10 of the wearer as narrow-width parallel light.

Specifically, first image display light Ld outputted from the center of the display panel 231 and second image display light Le and third image display light Lf outputted from both ends of the display panel 231 may travel while being narrowed by the lens 232 until reaching the holographic optical element 220. Therefore, the first image display light Ld, the second image display light Le, and the third image display light Lf may be incident onto the holographic optical element 220 with narrower incident ranges Ld-Ld, Le-Le, and Lf-Lf, respectively, than those of the embodiment, and may be diffracted and reflected as first reflected image display light Ld', second reflected image display light Le', and third reflected image display light Lf', respectively, by the holographic optical element 220. Then, the first reflected image display light Ld', the second reflected image display light Le', and the third reflected image display light Lf' may be directed toward the eye 10 of the wearer as the narrow-width parallel light.

That is, a portion, where the reflection range Ld'-Ld' of the first reflected image display light Ld', the reflection range Le'-Le' of the second reflected image display light Le', and the reflection range Lf'-Lf' of the third reflected image display light Lf' overlap one another, may be an eye motion box 2 (EMB2) where a plurality of exit pupils are located. Accordingly, it can be seen that the eye motion box 2 (EMB2), which is narrower than the eye motion box 1 (EMB1) of the embodiment, is formed. In such a case, when the eye 10 of the wearer is located within the area of the eye motion box 1 (EMB1) according to the embodiment but the position thereof is outside the area of the eye motion box 2 (EMB2) of the comparative example, a wearer using the head mounted display 200 of the comparative example may not properly visually recognize image information formed by being reflected by the holographic optical element 220.

MODE FOR INVENTION

Figure 4A:
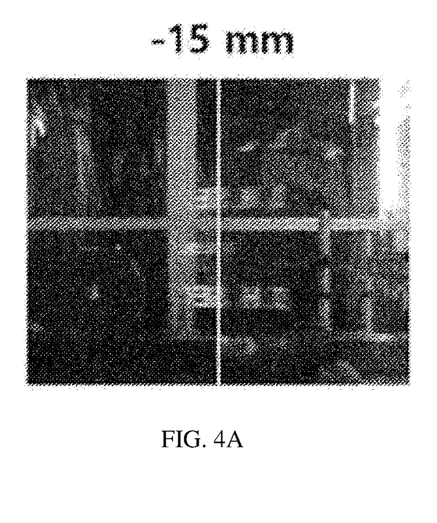
FIGS. 4A to 4C are views illustrating an eye motion box of the head mounted display according to the embodiment.
Figure 4B:
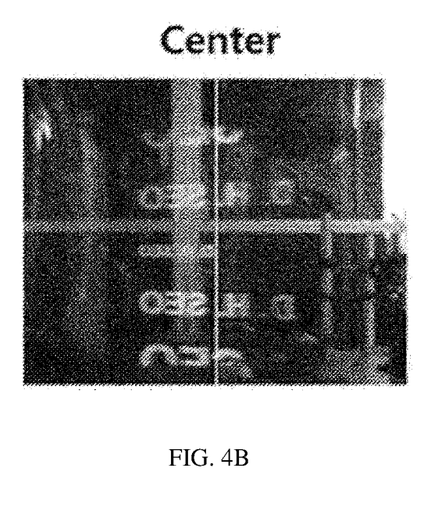
Figure 4C:
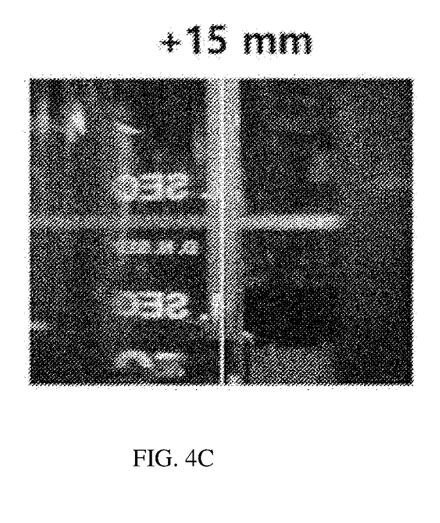
Figure 5A:
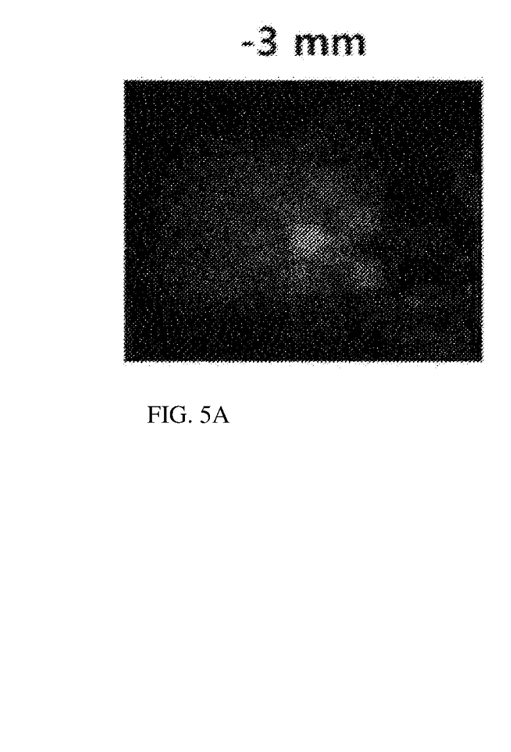
FIGS. 5A to 5C are views illustrating an eye motion box of the head mounted display according to the comparative example.
Figure 5B:
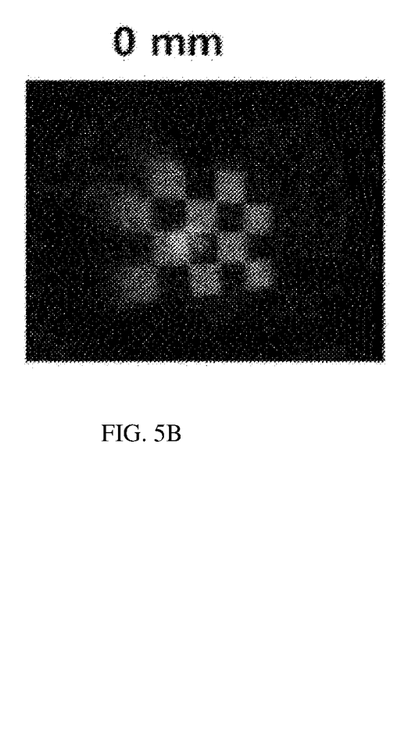
Figure 5C:
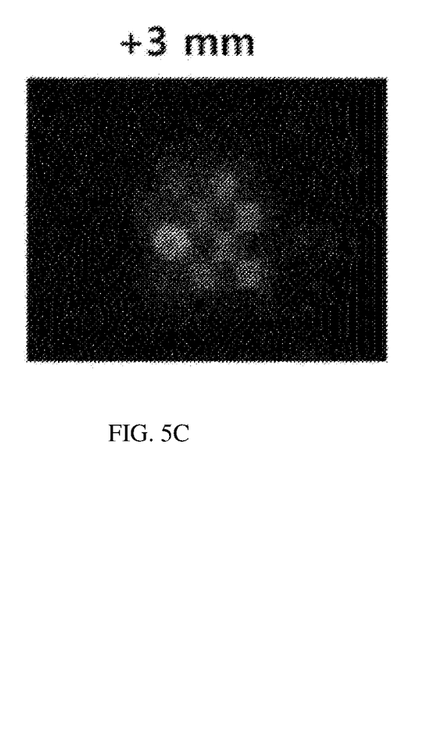

FIGS. 4A to 4C are views illustrating an eye motion box of the head mounted display according to the embodiment, and FIGS. 5A to 5C are views illustrating an eye motion box of the head mounted display according to the comparative example.

Referring to FIGS. 4A to 4C, the size of the eye motion box (EMB) of the head mounted display according to the embodiment is determined by the size of a reflective holographic optical element and the eye motion box (EMB) may have a size of 15 mm²×15 mm² or more.

On the other hand, referring to FIGS. 5A to 5C, the size of the eye motion box (EMB) of the head mounted display according to the comparative example is limited by a lens, and even when user's eyes move only by 3 mm left and right, a cut image is seen.

Meanwhile, in the embodiment of the present invention, the holographic optical element 120 is preferably disposed on the eye side 111 of the wearer who wears the lens unit 110. In a case that the lens unit 110 is a lens for correcting the vision of the wearer, when the holographic optical element 120 is disposed on the surface 112 opposite to the eye side 111 of the wearer who wears the lens unit 110, the image display light will reach the holographic optical element 120 via the lens unit 110 and be directed toward the eye 10 of the wearer via the lens unit 110 again. In such a case, a phenomenon, in which the image display light by the holographic optical element 120 is distorted in the lens unit 110, may occur.

In the embodiment of the present invention, the display panel 130 is preferably disposed to be spaced apart from a first surface A, which extends along the eye side 111 of the wearer who wears the lens unit 110, in a direction toward the rear of the eye 10 of the wearer, and outputs the image display light toward the eye side 111 of the wearer who wears the lens unit 110. If the display panel 130 is disposed on the first surface A, which extends along the eye side 111 of the wearer who wears the lens unit 110, or is disposed to be spaced apart from the first surface A in a direction toward the front of the eye 10 of the wearer from the first surface A, the image display light needs to be incident through the lateral side of the lens unit 110. In such a configuration, it is difficult to widely output the image display light and the size of the area of the holographic optical element 120 corresponding to the image display light is also limited. Therefore, it is difficult to form a wide eye motion box.

In the embodiment of the present invention, the lens unit 110 and the image display unit 130 may be installed on at least one of eyeglass frames, goggles, and a helmet.

Furthermore, FIG. 1 illustrates that the lens unit 110 and the image display unit 130 are implemented in a form corresponding to the right eye of the wearer; however, the present invention is not limited thereto and a pair of left and right lens units 110 may be provided to correspond to both eyes of the wearer, respectively, and a pair of left and right image display units 130 may be provided to correspond to both eyes of the wearer, respectively.

In accordance with the head mounted display according to the embodiment of the present invention, it is possible to secure a wide eye motion box while implementing a virtual image by using a reflective holographic optical element.

Although the present invention has been described in relation to the preferred embodiment described above, various corrections or modifications can be made without departing from the subject matter and scope of the disclosure. Therefore, the appended claims will include such corrections or modifications as long as they belong to the subject matter of the present invention.

The invention claimed is:

1. A head mounted display, comprising:
   a lens unit configured to be disposed in front of an eye of a wearer;
   an holographic optical element disposed on an eye side surface or a surface opposite the eye side surface of the lens unit; and
   an image display unit configured to be disposed on a lateral side of the eye of the wearer and configured to output image display light; and
   a portion where a reflection range of the image display light overlapped with one another forms an eye motion box where a plurality of exit pupils are located,
   wherein the image display unit includes a display panel that is at least one of a liquid crystal display panel or an organic light emitting display panel to output the image display light spread with a divergence angle toward the holographic optical element without a separate lens capable of condensing the image display light disposed between the display panel and the holographic optical element, such that all of the image display light output from a central portion and opposite ends of the image display unit travels while being diffused with the divergence angle until reaching the holographic optical element, and wherein the holographic optical element diffracts the image display light and reflects the diffracted image light toward the eye of the wearer as parallel light.

2. The head mounted display according to claim 1, wherein the holographic optical element is disposed on the eye side surface of the lens unit.

3. The head mounted display according to claim 1, wherein the at least one of the liquid crystal display panel of the organic light emitting display panel is spaced apart from a first surface, which extends along the eye side surface of the lens unit, in a direction toward rear of the eye of the wearer.

4. The head mounted display according to claim 1, wherein the lens unit includes a transparent or translucent substrate, wherein external light is able to be transmitted from the surface opposite the eye side surface to the eye side surface of the lens unit.

5. Eyeglass frames having the head mounted display of claim 1 installed thereon.

6. The head mounted display according to claim 1, wherein the lens unit comprises a right lens unit and a left lens unit corresponding to each eye of the wearer, respectively, and wherein the image display unit comprises a right image display unit and a left image display unit corresponding to each eye of the wearer, respectively.

7. Goggles having the head mounted display of claim 1 installed thereon.

8. A helmet having the head mounted display of claim 1 installed thereon.

* * * * *